US011436318B2

(12) United States Patent
Li et al.

(10) Patent No.: US 11,436,318 B2
(45) Date of Patent: Sep. 6, 2022

(54) SYSTEM AND METHOD FOR REMOTE ATTESTATION IN TRUSTED EXECUTION ENVIRONMENT CREATION USING VIRTUALIZATION TECHNOLOGY

(71) Applicant: VMware, Inc., Palo Alto, CA (US)

(72) Inventors: Ye Li, Newton, MA (US); David Ott, Chandler, AZ (US); Cyprien Laplace, Boston, MA (US); Alexander Fainkichen, Southborough, MA (US); Shruthi Hiriyuru, Medford, MA (US)

(73) Assignee: VMWARE, INC., Palo Alto, CA (US)

( * ) Notice: Subject to any disclaimer, the term of this patent is extended or adjusted under 35 U.S.C. 154(b) by 280 days.

(21) Appl. No.: 16/905,652

(22) Filed: Jun. 18, 2020

(65) Prior Publication Data

US 2021/0397698 A1    Dec. 23, 2021

(51) Int. Cl.
```
G06F 9/455     (2018.01)
G06F 21/53     (2013.01)
G06F 21/57     (2013.01)
G06F 21/60     (2013.01)
H04L 9/08      (2006.01)
H04L 9/32      (2006.01)
```
(52) U.S. Cl.
CPC .......... *G06F 21/53* (2013.01); *G06F 9/45558* (2013.01); *G06F 21/575* (2013.01); *G06F 21/606* (2013.01); *H04L 9/085* (2013.01); *H04L 9/0819* (2013.01); *H04L 9/3265* (2013.01); *G06F 2009/45583* (2013.01); *G06F 2009/45587* (2013.01); *G06F 2221/2149* (2013.01)

(58) Field of Classification Search
CPC ...... G06F 21/53; G06F 21/575; G06F 21/606; G06F 9/45558; G06F 2009/45583; G06F 2009/45587; G06F 2221/2149; H04L 9/0819; H04L 9/085; H04L 9/3265
See application file for complete search history.

(56) References Cited

U.S. PATENT DOCUMENTS

2016/0350534 A1* 12/2016 Poornachandran ... H04L 9/3273
2018/0041543 A1*  2/2018 Rahardjo .............. H04L 63/08
2021/0263757 A1*  8/2021 Tsirkin ................. G06F 21/57

* cited by examiner

*Primary Examiner* — Matthew T Henning
(74) *Attorney, Agent, or Firm* — Loza & Loza, LLP

(57) ABSTRACT

System and method for performing a remote attestation for creation of a trusted execution environment (TEE) using a virtual secure enclave device running in a virtualized environment utilizes a trusted bootloader appliance in a TEE virtual computing instance, which is created in response to a request for a TEE from a software process running in the system. The trusted bootloader appliance manages the provisioning of a TEE in the TEE virtual computing instance for the software process. The remote attestation includes performing a first stage attestation on the trusted bootloader appliance by a hardware platform of the computer system and performing a second stage attestation on the provisioned TEE by the trusted bootloader appliance.

20 Claims, 4 Drawing Sheets

US 11,436,318 B2

SYSTEM AND METHOD FOR REMOTE ATTESTATION IN TRUSTED EXECUTION ENVIRONMENT CREATION USING VIRTUALIZATION TECHNOLOGY

BACKGROUND

Intel® Software Guard Extension (SGX) is a hardware technology that can be used to provide isolated application environments, or enclaves, for secure applications. The Intel SGX features isolated, encrypted memory regions for user-level application code and data. It ensures data confidentiality and code integrity even if the operating system is compromised. The SGX hardware provides attestation services to verify the authenticity of platforms and integrity of enclaves.

Intel SGX has been highly influential within the world of trusted execution environments (TEEs) in recent years, increasing interest in various use cases and programming models. Another trend has been the growing diversity of TEE hardware technologies and programming models. In addition to SGX, TEEs have been developed in both academia and industry using Arm TrustZone and RISC-V. Importantly, other TEE schemes have been developed which leverage hardware features not specifically designed for TEEs but usable as building blocks. Examples of such technologies include AMD Secure Encrypted Virtualization (SEV) and Intel® Multi-Key Total Memory Encryption (MKTME), which provide hardware encrypted virtual machines (VMs) that remove the hypervisor from the chain of trust for VM/application owners.

Thus, using a virtualization technique, these hardware encrypted VMs can provide TEEs that are comparable to secure memory enclaves, such as Intel SGX enclaves. However, using a virtualization technique to create TEEs presents a challenge with respect to remote attestation for the TEE creation process, which involves software components and operations that require a hardware Root of Trust.

BRIEF DESCRIPTION OF THE DRAWINGS

Throughout the description, similar reference numbers may be used to identify similar elements.

DETAILED DESCRIPTION

Figure 1:
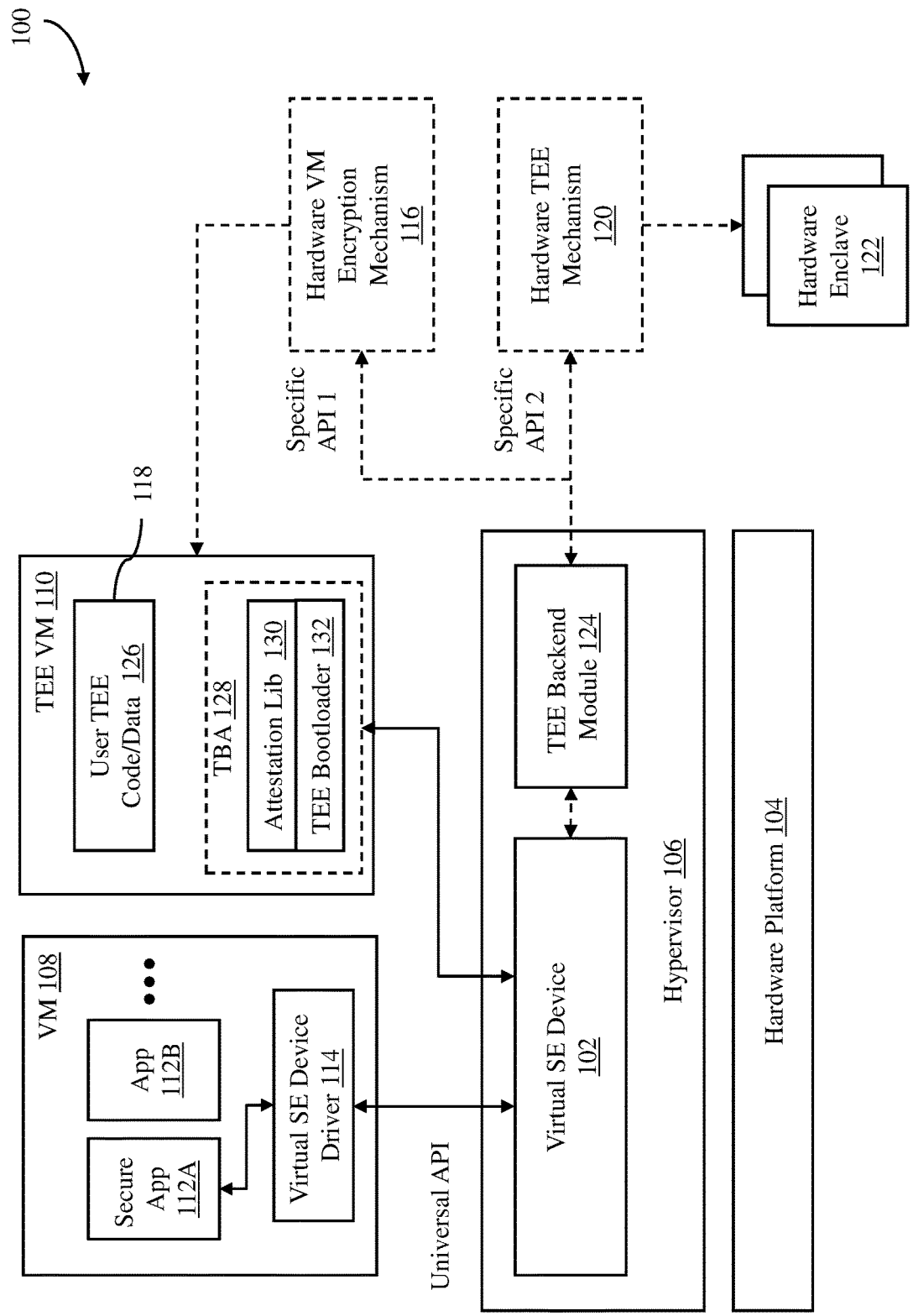
FIG. 1 is a block diagram of a system architecture that provides a virtualization-based trusted execution environment (TEE) using a virtual secure enclave device in a virtualized environment and provides for a secure remote attestation mechanism of the TEE in accordance with an embodiment of the invention.

FIG. 1 is a high-level view of a system architecture 100 in accordance with an embodiment of the invention that provides a virtualization-based trusted execution environment (TEE) using a virtual secure enclave (SE) device 102 in a virtualized environment and that also provides a secure remote attestation mechanism for the virtualization-based TEE. This architecture allows any deployed software processes, such as applications, to use any hardware virtual machine (VM) encryption mechanism available in the system to produce a virtualization-based TEE and also allows users of the software processes to verify that intended code and data are securely loaded and executed in the TEE. As described herein, the use of the virtual SE device 102 provides for easy discovery and configuration of TEE capabilities available in any computer system. Thus, the virtual SE device 102 provides a unified interface to use the available hardware TEE capabilities in any system, which simplifies SDK integration and avoids N SDKs to M hardware TEE technologies mappings, and allows for migration of software processes from a computer system with particular hardware TEE capabilities to another computer system with different hardware TEE capabilities. In addition, the remote attestation mechanism of the system provides a "proof" that a virtualization-based TEE created in the system can be trusted.

As shown in FIG. 1, the system architecture 100 includes a physical hardware platform 104, which includes hardware components commonly found in a computer system, such as one or more central processing units (CPUs) and memory. A virtualization software 106, such as a hypervisor, runs on the physical hardware platform, to host or support a number of virtual computing instances (VCIs) 108, including any TEE VCIs 110. As used herein, a VCI can be any isolated software entity that can run on a computer system, such as a software application, a software process, a virtual machine (VM) or a virtual container. A VM is an emulation of a computer system in the form of a software computer that, like a physical computer, can run an operating system and applications. A VM may be comprised of a set of specification and configuration files and is backed by the physical resources of a physical host computer. An example of such a VM is a VM created using VMware vSphere® solution made commercially available from VMware, Inc of Palo Alto, Calif. A virtual container is a package that relies on virtual isolation to deploy and run applications that access a shared operating system (OS) kernel. An example of a virtual container is a virtual container created using a Docker engine made available by Docker, Inc. Although the virtualization software 106 may support different types of VCIs, the virtualization software 106 will be described herein as supporting VMs. Thus, in FIG. 1, the VCIs 108 and 110 are illustrated as VMs.

As shown in FIG. 1, each of the VMs 108 includes a number of software applications 112 (e.g., applications 112A, 112B . . . ) running on a guest operating system (OS) (not shown in FIG. 1) of the VM. The software applications 112 can be any software programs, processes or routines running on the VM. Some of these applications 112 may need to protect sensitive content or information, such as codes and/or data. As used herein, codes of sensitive content may refer to computer codes that can execute software routines, and data of sensitive content may refer to any confidential information, such as encryption keys. As an example, one of the applications 112 may be a secure application 112A, which may need to protect sensitive content in a trusted execution environment (TEE), which may be a hardware enclave or a virtualization-based TEE, as described below.

The VM 108 further includes a virtual SE device driver 114, which is used by the guest OS of the VM to communicate with the virtual SE device 102. Thus, when any application running in the VM 108, such as the secure application 112A, wants to use a TEE for its code and/or data, the guest OS on which the application is running can communicate with the virtual SE device 102 to execute various operations associated with the creation and management of the TEE.

As illustrated in FIG. 1, the hardware platform 104 includes a hardware VM encryption mechanism 116, which can be used to create one or more virtualization-based TEEs in TEE VMs, such as a TEE 118 in the TEE VM 110 depicted in FIG. 1. The TEE VM 110 is described in detail below. Examples of the hardware VM encryption mechanism 116 include AMD Secure Encrypted Virtualization (SEV) and Intel® Multi-Key Total Memory Encryption (MKTME). The hardware platform 104 may also include a hardware TEE mechanism 120, which can be used to create one or more hardware secure memory enclaves 122. An example of the hardware TEE mechanism 120 is Intel® SGX hardware. Thus, the hardware VM encryption mechanism 116 and/or the hardware TEE mechanism 120 available in a particular computer system can vary from one system to another.

Depending on the hardware VM encryption mechanism 116 and/or the hardware TEE mechanism 120 available in the system architecture 100, the virtual SE device 102 will leverage that hardware VM encryption mechanism and/or hardware TEE mechanism to provide requested TEEs to any software process running in the system, such as the secure application 112A. The virtual SE device 102 operates to interface with any software process with TEE needs to manage one or more TEEs, which can be, for example, created, configured, executed and removed. Thus, the secure application only needs to communicate with the virtual SE device 102 for any operations relating to TEEs. However, these operations with respect to TEEs are actually performed by the hardware VM encryption mechanism 116 and/or the hardware TEE mechanism 120 in the system. Thus, the secure applications do not have to follow the specific protocols, such as specific commands, required by the hardware VM encryption mechanism and the hardware TEE mechanism of the system to perform various operations with respect to TEEs.

The interactions with the hardware VM encryption mechanism 116 and the hardware TEE mechanism 120 are executed by a TEE backend module 124 in the hypervisor 106. The TEE backend module uses the specific protocol for the particular hardware VM encryption mechanism 116 available in the system to instruct the hardware VM encryption mechanism to execute various operations relating to virtualization-based TEEs in response to commands made to the virtual SE device 102. Similarly, the TEE backend module uses the specific protocol for the particular hardware TEE mechanism 120 available in the system to instruct the hardware TEE mechanism to execute various operations relating to hardware secure memory enclaves in response to commands made to the virtual SE device 102. As illustrated in FIG. 1, a specific application programming interface (API) 1 is used for communications between the TEE backend module 124 and the hardware VM encryption mechanism 116. In addition, a specific API 2 is used for communications between the TEE backend module 124 and the hardware TEE mechanism 120. These specific APIs will vary depending on the hardware VM encryption mechanism 116 and the hardware TEE mechanism 120 available in the system.

In contrast, as illustrated in FIG. 1, the interactions between the virtual SE device driver 114 and the virtual SE device 102 are executed using a common universal API, which is the same regardless of the hardware VM encryption mechanism 116 and the hardware TEE mechanism 120 included in the system. Thus, communications between the virtual SE device driver 114 and the virtual SE device 102 are executed using the same universal API for all the different types of hardware VM encryption mechanisms and hardware TEE mechanisms that can be available in the system. Thus, this universal API is an API that unifies all the different hardware VM encryption mechanisms and hardware TEE mechanisms that can found in computer systems.

One way to view this process is that the TEE operation commands issued to the virtual SE device 102 are achieved using the universal API. However, the TEE operation commands to the virtual SE device 102 are then translated to the specific APIs that depend on the hardware VM encryption mechanism 116 and the hardware TEE mechanism 120 included in the computer system. Thus, regardless of the hardware VM encryption mechanism and the hardware TEE mechanism included in the computer system, the TEE operation commands issued to the virtual SE device 102 from the secure applications are the same. However, the TEE operation commands issued to the hardware VM encryption mechanism and the hardware TEE mechanism by the TEE backend module 124 are specific to the hardware VM encryption mechanism and the hardware TEE mechanism included in the computer system. If the computer system had different hardware VM encryption mechanism and/or hardware TEE mechanism, then the TEE operation commands issued to these mechanisms by the TEE backend module 124 would be different and specific to those mechanisms.

This process allows software development kits (SDKs) to focus on the interface to the virtual SE device 102 without having to worry about the hardware VM encryption mechanism and the hardware TEE mechanism included in the computer system. Thus, each SKD would require a mapping to a single device for each of the hardware VM encryption and TEE mechanisms, rather than mapping to multiple devices for the hardware VM encryption mechanism and for the hardware TEE mechanism. Therefore, the system architecture 100 avoids the N SDKs to M technologies mappings for the hardware VM encryption mechanism and for the hardware TEE mechanism.

Another advantage of the system architecture 100 is that the VCIs, e.g., VMs, can be migrated between host computer systems with different hardware VM encryption and TEE mechanisms and the applications running in the migrated VMs will be able to use the hardware capabilities of the destination computer systems. In conventional systems, when a VM is migrated from a source host computer system with one type of hardware VM encryption and TEE mechanisms to a destination host computer system with another type of hardware VM encryption and TEE mechanisms, the applications running in the migrated VM may not be able to use the corresponding hardware capabilities of the destination computer system because the APIs used in the source host computer are not the same APIs needed in the destination host computer. However, using the system architecture 100, the APIs used to communicate with the virtual SE device 102 in the source host computer system will be the same APIs used to communicate with the virtual SE device in the destination host computer system. Thus, VM can be migrated between host computer systems with different hardware VM encryption and TEE mechanisms without any issues of whether the applications running in the migrated VM can use the hardware capabilities of the destination computer systems.

The TEE VM 110 of the system is used to facilitate the creation of a virtualization-based TEE 118 within the TEE VM for a software process, such as the secure application 112A, via the virtual SE device 102. This TEE creation process includes loading the software process' code and data 126 to be protected into the TEE 118. In addition, the TEE VM 110 facilitates a remote attestation procedure to "prove" to the software process or its user that the newly created TEE 118 within the TEE VM has been properly created on a trusted platform and properly loaded with the intended code and data. The TEE VM 110 isolates a software process' runtime environment from the rest of the system (and potential adversaries) with the help of additional hardware protections that are common features on modern processors. Such features not only help to isolate VM memory pages and runtime environment, they often provide encryption technologies (e.g., AMD SEV and Intel MKTME) which further protect a VM from memory side channels and hypervisor-based attacks. Importantly, this allows hypervisors to be excluded from the Trusted Computing Base (TCB) underlying the TEE solution as a whole.

As shown in FIG. 1, the TEE VM 110 includes a trusted bootstrap appliance (TBA) 128, which may be deployed using a set of libraries that are loaded into the TEE VM by the virtual SE device 102 after the TEE VM is created. Overall, the TBA 128 serves two purposes. First, the TBA 128 provides a TEE bootloader 130 for use in bootstrapping the TEE for a requesting software process, e.g., the secure application 112A, which includes securely loading the requesting software process' code and data to be protected into the TEE. Thus, the TBA 128 manages the provisioning of a TEE for a software process that makes a TEE creation request. Second, the TBA 128 includes an attestation library 132 to perform remote attestation, as described in detail below.

The use of the TBA 128 allows the remote attestation to be decoupled from the implementation-specific details of the underlying platform. It also allows for a uniform mechanism for remote attestation across heterogeneous platform environments. However, a challenge to the use of such a TBA is how to establish trust in the TBA which could be compromised by an adversary during the TEE VM creation and initialization. As described in below, this challenge is addressed by an overall attestation solution that will first address attesting the TBA itself before going on to attest the provisioning of the TEE VM, which provides a TEE in a secure virtualized computing environment.

Overall, when a software process, such as the secure application 112A, wishes to create a virtualization-based TEE for its code and data, the virtual SE device 102 (as part of the hypervisor 106) will first create a protected VM, e.g., the TEE VM 110, for use in hosting and isolating application code and data in a safe manner. Then, the TBA 128 will be provisioned and remote attestation performed to provide evidence of correct TBA provisioning. The software process will then provide code and data for the TEE with the help of the TBA. Upon completion, the TBA will perform attestation to provide evidence of correct TEE provisioning. This attestation mechanism starts with a hardware Root of Trust from the underlying hardware platform 104, and then extends this trust to the TBA in what is referred to as a "chain of trust" within the trusted computing literature.

The creation and attestation processes for the hardware secure memory enclaves 122 are executed and provided by the hardware TEE mechanism 120 in a well-known manner. Thus, these processes with respect to the hardware secure memory enclaves are not described herein.

Figure 2:
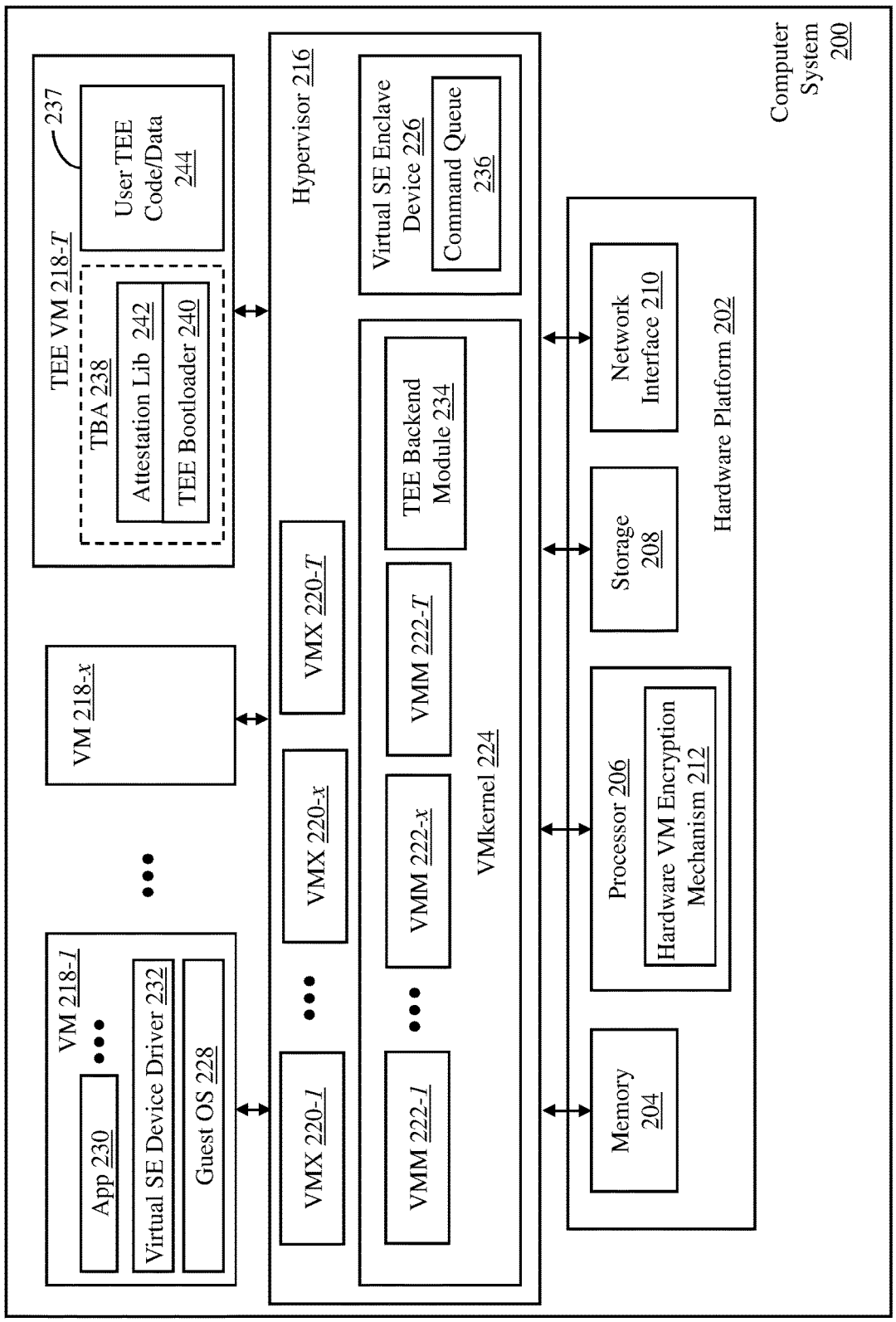
FIG. 2 is a block diagram of a computer system with a virtual secure enclave device that uses a trusted bootstrap appliance in a TEE virtual machine (VM) in accordance with an embodiment of the invention.

Turning now to FIG. 2, a computer system 200 in accordance with an embodiment of the invention is shown. The computer system 200 implements the system architecture 100 described above to manage virtualization-based TEEs regardless of the hardware VM encryption mechanism available in the system and to provide remote attestation that TEEs have been properly created when requested by software processes running in the computer system using a TBA. The computer system 200 may also include a hardware TEE mechanism. However, the computer system 200 is not illustrated or described herein as including a hardware TEE mechanism.

The computer system 200 includes a physical hardware platform 202, which provides a hardware Root of Trust and includes at least one or more system memories 204, one or more processors 206, a storage 208, and a network interface 210. Each system memory 204, which may be random access memory (RAM), is the volatile memory of the computer system 200. Each processor 206 can be any type of a processor, such as a central processing unit (CPU) commonly found in a server computer. In the illustrated embodiment, the processor 206 includes a hardware VM encryption mechanism 212, for example, AMD SEV and Intel MKTME. The hardware VM encryption mechanism 212 provides a TEE in a virtualized computing environment, e.g., a VM, which can be used by software processes running in the computer system 200. The storage 208 can be any type of non-volatile computer storage with one or more storage devices, such as a solid-state devices (SSDs) and hard disks. Although the storage 208 is shown in FIG. 2 as being a local storage, in other embodiments, the storage 208 may be a remote storage, such as a network-attached storage (NAS). The network interface 210 is any interface that allows the computer system 200 to communicate with other devices through one or more computer networks. As an example, the network interface 210 may be a network interface controller (NIC).

The computer system 200 further includes a virtualization software 216 running directly on the hardware platform 202 or on an operation system (OS) of the computer system 200. The virtualization software 216 can support one or more VCIs. In addition, the virtualization software 216 can deploy or create VCIs on demand. In the illustrated embodiment, the virtualization software 216 is a hypervisor, which enables sharing of the hardware resources of the computer system 200 by VCIs in the form of VMs that are hosted by the hypervisor. One example of a hypervisor that may be used in an embodiment described herein is a VMware ESXi™ hypervisor provided as part of the VMware vSphere® solution made commercially available from VMware, Inc. of Palo Alto, Calif.

The hypervisor 216 provides a device driver layer configured to map physical resources of the hardware platform 202 to "virtual" resources of each VM supported by the hypervisor such that each VM has its own corresponding virtual hardware platform. Each such virtual hardware platform provides emulated or virtualized hardware (e.g., memory, processor, storage, network interface, etc.) that may, for example, function as an equivalent, conventional hardware architecture for its corresponding VM.

In FIG. 2, the computer system 200 is shown to include a number of VMs 218-*l* to 218-*x*, including a TEE VM 218-T, supported by the hypervisor 216. Each of these VMs has a virtual hardware platform, which is an emulation of the physical hardware platform that has been allocated to that VM. Thus, each virtual hardware platform includes at least emulated memory, emulated processor, virtual storage and virtual network interface, which correspond to the memory 204, the processor 206, the storage 208 and the network interface 210, respectively, of the hardware platform 202 of the computer system 200. The virtual hardware platform for each of the VMs is provided by a virtual machine executable (VMX) module 220-$i$ and a virtual machine monitor (VMM) 222-$i$ for that VM in the hypervisor 216. Thus, there are same number of VMX module 220-$l$ to 220-$x$ and 220-T and same number of VMMs 222-$l$ to 222-$x$ and 222-T as the VMs 218-$l$ to 218-$x$ and 218-T.

In an embodiment, the VMMs 222-$i$ run in a VMkernel 224 of the hypervisor 216. The VMkernel is a Portable Operating System Interface (POSIX) like operating system. The VMkernel is the liaison between the VMs 218-$i$ and the physical hardware that supports them. The VMkernel runs on bare metal and is responsible for allocating memory, scheduling CPUs and providing other hardware abstraction and OS services.

For each VM 218-$i$, the associated VMM 222-$i$ and VMX module 220-$i$ for that VM operate to emulate the hardware resources of the computer system 200 for that VM. In addition to the emulation of the computer hardware resources for a VM, each VMX module is responsible for handling input/output (I/O) to devices that are not critical to performance. The VMX module is also responsible for communicating with user interfaces and other modules. Each VMM is responsible for virtualizing the guest OS instructions from the VM and the management of memory. In addition, the VMM operates to pass storage and network I/O requests to the VMkernel 224, and to pass all other requests to the VMX module. The VMM and VMX module for each VM may also assist in the transmission of TEE commands between the hardware VM encryption 212 and a virtual SE device 226, which is running in a virtualized environment provided by the hypervisor 216. The virtual SE device 226 is described in detail below.

With the support of the hypervisor 216, the VMs 218-$l$ to 218-$x$ provide isolated execution spaces for guest software. Each VM includes a guest operating system 228, and one or more guest applications 230, some of which may be secure applications that use TEEs created using the hardware VM encryption mechanism 212 via the virtual SE device 226, such as a TEE provided by the TEE VM 218-T. The guest OS 228 manages virtual hardware resources made available to the corresponding VM by the hypervisor 216, and, among other things, the guest OS forms a software platform on top of which the guest applications 230 run. Each VM may also include a virtual SE device driver 232 to communicate with the virtual SE device 226.

The computer system 200 with the deployed VMs 218-$l$ to 218-$x$ may have various software processes running in the computer system. As an example, one or more software processes may be running on the host OS of the computer system 200, one or more software processes may be running on the guest OSs 228 of the VMs as guest applications 230, and one or more software processes may be running in the hypervisor 216. Any of these software processes may use TEEs provided by the hardware VM encryption mechanism 212 via the virtual SE device 226 using a TEE VM, such as the TEE VM 218-T, as described below.

Similar to the virtual SE device 102 shown in FIG. 1, the virtual SE device 226 operates to interface with software processes, such as the applications 230 running in the VMs 218-$l$ to 218-$x$, to manage virtualization-based TEEs, which can be, for example, created, configured, executed and removed with the aid of a TEE VM. Thus, the software processes only need to communicate with the virtual SE device 226 and a TEE VM for any operations relating to TEEs. However, these operations with respect to TEEs are actually performed by the hardware VM encryption mechanism 212 of the computer system 200. Thus, the software processes do not have to follow the specific protocols required by the hardware VM encryption mechanism 212 of the computer system 200 to instruct the hardware VM encryption mechanism to perform various operations with respect to TEEs. The interactions with the hardware VM encryption mechanism 212 are executed by a TEE backend module 234. In an embodiment, TEE operation commands issued to the virtual SE device 226 from a software process, such as one of the guest applications 230, via the virtual SE device driver 232 using the universal API are be viewed as being translated by the TEE backend module 234 to TEE operation commands to the hardware VM encryption mechanism 212 in the computer system 200 using the API specific to the hardware VM encryption mechanism 212. These translated TEE operation commands are then issued to the hardware VM encryption mechanism 212 so that the hardware VM encryption mechanism can execute the requested TEE operations.

In an embodiment, the virtual SE device 226 includes a command queue 236 that can store TEE commands issued by the secure applications in the computer system 200, such as the guest applications 230 running in the VMs 218-$l$ to 218-$x$. The command queue 236 is exposed to any secure applications in the computer system 200 so that the secure applications can send TEE commands to the command queue 236 of the virtual SE device 226.

In an embodiment, when a TEE command is added to the command queue 236 of the virtual SE device 226 from a guest application 230 running in the VM 218-$i$, the VMM 220-$i$ associated with that VM is notified of the TEE command. In response to the notification, a request is made by the VMM to the VMX module 222-$i$ associated with that VM for emulation of the command queue 236 in the virtual SE device 226. In response to this request, the command queue 236 in the virtual SE device 226, including all the new or outstanding TEE commands, is emulated by the VMX module. As part of this emulation process, the TEE commands are retrieved by the VMX module. In addition, the TEE commands are parsed by the VMX module to extract information contained in the TEE commands, such as descriptions of TEE operations included in the TEE commands. In the illustrated embodiment, the emulation of the command queue 236 in the virtual SE device 226 is performed within the VMkernel 224, which may have performance advantages. However, in other embodiments, the emulation of the command queue 236 in the virtual SE device 226 may be performed elsewhere in the hypervisor 216.

Based on the information contained in the TEE commands, services corresponding to the new TEE commands are requested from the TEE backend module 234 by the VMX module 220-$i$. In an embodiment, these services requests may be made using system calls to the TEE backend module 234 inside the VMkernel 224. In response to these service requests, the hardware VM encryption mechanism 212 is engaged by the TEE backend module 234 to fulfill the requested services or operations. In an embodiment, this engagement or interaction may involve issuing appropriate TEE commands for the requested services to the hardware VM encryption mechanism 212, which would cause the hardware VM encryption mechanism to execute the requested services or operations, such as TEE VM creation, TEE VM configuration, and TEE VM removal operations. Thus, the applications 230 that are issuing the TEE commands do not have to conform to any requirements of the hardware VM encryption mechanism 212 of the computer system 200, which may vary from one computer system to another computer system depending on the hardware VM encryption capabilities of the systems.

The TEE VM 218-T of the computer system 200 is similar to the TEE VM 110 of FIG. 1. The TEE VM 218-T is deployed when one of the applications 230 requests a TEE, which would be fulfilled by the creation of a virtualization-based TEE 237 in the TEE VM. Thus, in some situations, there may be more than one TEE VM deployed on the computer system. Similar to the TEE VM 110, the TEE VM 218-T includes a TBA 238, which includes a TEE bootloader 240 and an attestation library 242. The TEE bootloader is configured to bootstrap the application TEE 237. The attestation library is configured to perform remote attestation, as described below.

In an embodiment, the remote attestation is executed in two stages. In the first stage, in response to a TEE request from an application 230 running in the computer system 200, a TEE VM, such as the TEE VM 218-T, is deployed and the TBA 238 is provisioned in the TEE VM. In addition, a secure channel is set up between the requesting application and the TBA. The TEE VM is used to host and isolate application's code and data 244 within the TEE 237 in a safe manner. The TBA is used in the second stage to provision the TEE 237 and to provide evidence of correct TEE provisioning. For the first stage, a first attestation report is obtained from the underlying hardware platform 202 of the computer system to serve as the proof of the integrity and authenticity of the TBA and the platform. In the second stage, in response to commands from the requesting application, the TEE is composed using data and code from the requesting application with the help of the TBA. For this second stage, a second attestation report is generated by the TBA to show that code and data from the requesting application have been corrected loaded in the TEE VM by the TBA, which is trustworthy based on the first attestation report. Thus, the trust starts with a hardware root of trust (the underlying hardware platform 202), and then this trust is extended to the TBA in what is referred to as a "chain of trust" within the trusted computing literature.

Figure 3:
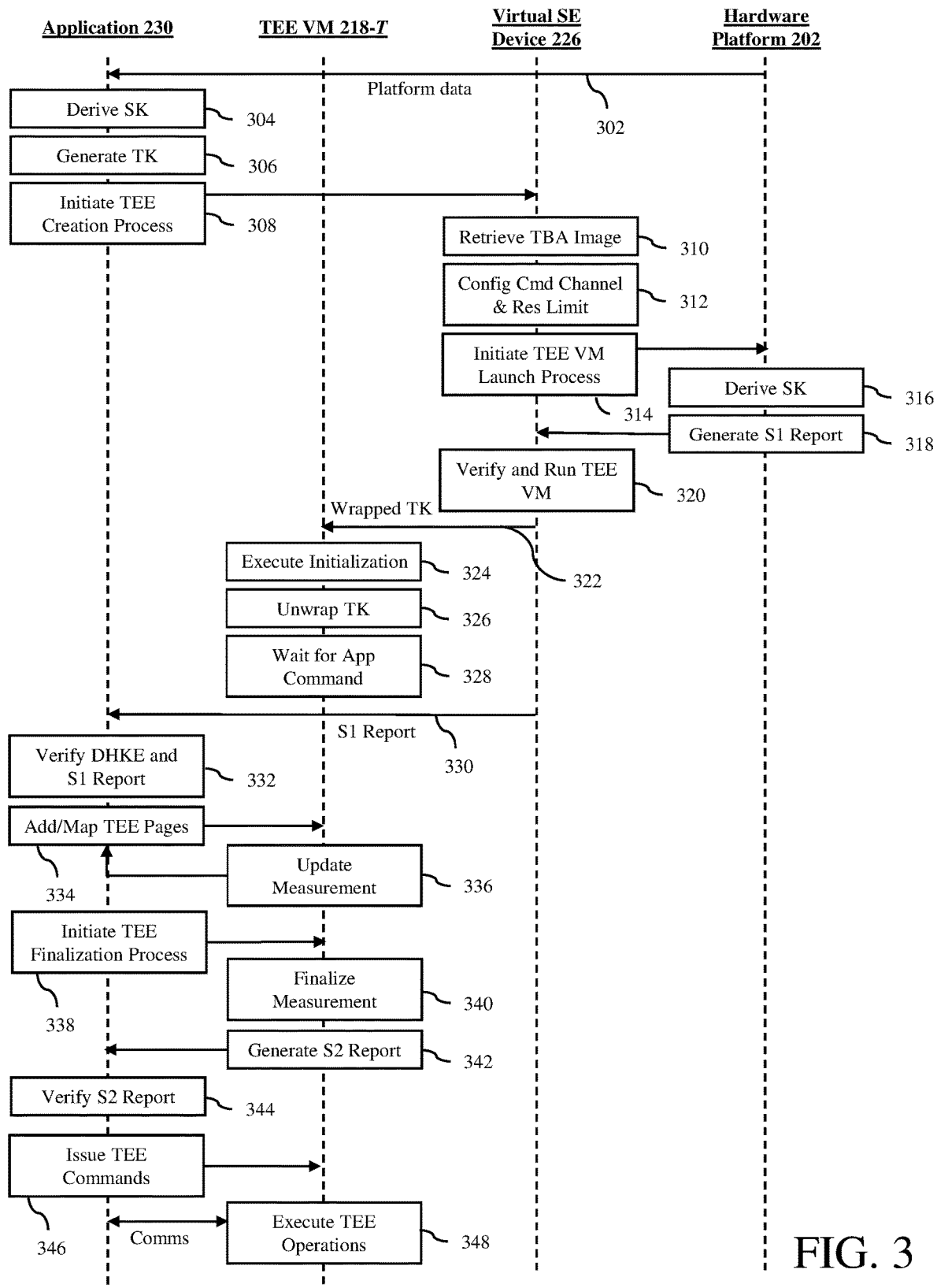
FIG. 3 is a process flow diagram of a remote attestation operation of the computer system of FIG. 2 using a TEE VM in accordance with an embodiment of the invention.

A remote attestation operation of the computer system 200 using a TEE VM, such as the TEE VM 218-T, in accordance with an embodiment of the invention is now described with reference to a process flow diagram of FIG. 3. The remote attestation process begins at step 302, where platform data is retrieved from the hardware platform 202 of the computer system 200, which includes the hardware VM encryption mechanism 212, by a software process, such as one of the applications 230 running in one of the VMs 218, that wants to create a TEE. The platform data may include, for example, platform key, e.g., a Diffie-Helman (DH) key, and an expected TBA measurement, which may be in the form of a hash value.

Next, at step 304, a shared secret key (SK) is derived by the application 230 as a result of a key exchange algorithm between the application and the underlying hardware platform 202 of the host computer. In an embodiment, the SK is created from a shared secret in the key exchange algorithm, which may be a DH key exchange algorithm, executed by the application and the hardware platform 202.

Next, step 306, a transport key (TK) is randomly generated by the application 230, i.e., the owner, that is destined for a TBA, such as the TBA 238 shown in FIG. 2, which will be created for the TEE request. This TK will be secretly shared with the TBA by wrapping the TD with the SK to establish a secure communication channel between the TBA and the virtual SE device in the hypervisor. In an embodiment, this secure communication channel may be a bi-directional channel.

Next, at step 308, a TEE creation process is initiated by the application 230 to create a TEE to be used by the application for its code and data. As part of this process, owner DH key and session information are transmitted from the application to the virtual SE device 226 for the virtual SE device to create a TEE VM for the TBA 238. In an embodiment, the session information includes materials for DH, e.g., the public DH key used for the DH algorithm, an initialization vector (IV) to avoid replay attacks, and a wrapped TK, i.e., the TK that is wrapped or encrypted with the SK.

Next, at step 310, a TBA image is retrieved and loaded by the virtual SE device 226. The TBA image may be retrieved from a source storage, which may be the local storage of the host computer or an external storage that is accessible by the host computer.

Next, at step 312, the TBA 238 is configured by the virtual SE device 226 according to the request from the application 230. As an example, the configuration may include setting resource limits for the TBA and/or customization of command channel between the software process and the TBA, e.g., whether the channel is implemented as shared memory or over a network.

Next, at step 314, a launch process of the TEE VM is initiated by the virtual SE device. As part of this launch process, the application DH key, the session information and the TBA image are loaded to the hardware platform 202.

Next, at step 316, the SK is derived using the application DH key by the hardware platform 202. The SK is the same SK that was derived by the application 230. As noted above, in an embodiment, the SK is created from a shared secret in the key exchange algorithm, which may be a DH key exchange algorithm.

Next, at step 318, a stage 1 attestation report is generated by the hardware platform 202 and transmitted to the virtual SE device 226. As part of the report generation process, the TBA measurement, e.g., a hash value of the TBA image, is generated by the hardware platform, which is included in the stage 1 attestation report. In an embodiment, the stage 1 attestation report further includes a digital signature (e.g., a message authentication code (MAC)) with a certificate from a trusted Certificate Authority (CA), which may be provided by the hardware manufacturer or a third party endorsed by the hardware manufacturer.

Next, at step 320, the TEE VM 218-T is launched after the stage 1 attestation report has been verified by the virtual SE device 226. In an embodiment, the TBA measurement included in the stage 1 attestation report is a hash value and the verification of the stage 1 attestation involves comparing this hash value with the expected hash value.

Next, at step 322, a wrapped TK is transmitted to the TEE VM 218-T by the virtual SE device 226 through the secure command channel or any other communication channel. As described below, the wrapped TK can be used by the TEE VM to show the TEE requesting application 230 that the TEE VM can be trusted.

Next, at step 324, an internal initialization is executed by the TEE VM 218-T. This initialization process can be a typical VM initialization for a VM that has been deployed and activated.

Next, at step 326, the TK is unwrapped by the TEE VM 218-T with help from the hardware platform 202, which possesses the SK to decrypt the TK. Since the derivation of the SK during the key exchange is backed by the hardware platform 202, the SK is trusted and rooted to the hardware. Similarly, since the TK is wrapped with the SK, the software process can trust that only the TEE VM 218-T, in particular the TBA 238, and the application have access to the TK. In an embodiment (e.g., for AMD SEV), the wrapped TK is sent to the TEE VM with hardware instruction as the input of the hardware instruction. In response to the hardware instruction, the hardware platform unwraps the TK using the SK and copy the unwrapped into the TEE VM memory.

Next, at step 328, a mode is entered by the TEE VM to wait for commands from the software process.

Next, at step 330, the stage 1 attestation report and its associated certification chain are transmitted to the application 230 from the virtual SE device 226.

Next, at step 332, the DH key exchange and the stage 1 attestation report are verified by the application 230. In an embodiment, the stage 1 attestation report is at least partly verified by comparing the hash value of TBA image included in the report and an expected hash value, which can be generated by the application 230 using a TBA image from a trusted source. A successful verification of the stage 1 attestation report would indicate that the TBA 238 has been properly provisioned, and thus, can now be trusted by the application. This completes the stage 1 attestation process.

The stage 2 attestation process begins at step 334, where a page adding/mapping process is initiated by the application 230 to add TEE pages to the TEE being created. As part of this process, one or more commands to add the TEE memory pages, which include memory page mapping information, are transmitted to the TEE VM 218-T from the application. As used herein, memory page mapping information includes virtual to physical address mapping and memory access permission (e.g., read, write and execute). In an embodiment, these commands from the application to the TEE VM may be encrypted with the TK to ensure secure transmission.

Next, at step 336, in response to the commands to add and map TEE pages, measurement of the TEE is updated by the TEE VM 218-T. In an embodiment, the measurement is updated by generating a new hash value for the TEE with the added pages.

Steps 334 and 336 may be repeated to add and map more TEE pages by the application 230, which would then require the TEE measurement to be updated accordingly.

Next, at step 338, a TEE finalization process is initiated by the application 230 once all the needed TEE pages have been added and mapped. As part of this process, a command is transmitted from the application to the TEE VM 218-T to notify the TEE VM that the TEE can now be finalized. Again, this command from the application to the TEE VM may be encrypted using the TK to ensure secure transmission.

Next, at step 340, in response to the TEE finalization command, the measurement of the TEE is finalized by the TEE VM. In an embodiment, the measurement of the TEE is finalized by marking the latest TEE measurement as the final TEE measurement.

Next, at step 342, a stage 2 attestation report is generated by the TEE VM 218-T and transmitted to the application 230. As part of this second report generation process, a message authentication code (MAC) is generated by the TEE VM using the TK. In an embodiment, the contents of the stage 2 attestation report may include TEE measurement (e.g., a hash value of the created TEE), TBA revision, TEE policy, TEE attributes and/or a report signature, which may be the MAC. A TEE policy may be a mask of the backend allowed to actually host the TEE. For example, a TEE might specify only SGX and SEV VM can be used as backend. One example of TEE attributes may be whether the TEE is a debug TEE or production TEE.

Next, at step 344, the stage 2 attestation report is verified by the application 230. In an embodiment, the stage 2 attestation report is at least partly verified by comparing the hash value of the TEE included in the report and an expected hash value of the TEE, which can be generated by the application 230 using the TEE memory pages that were added to the TEE. A successful verification of the stage 2 attestation report would indicate that the TEE has been properly provisioned and correctly loaded with the application's code and data. This completes the stage 2 attestation process.

Next, at step 346, TEE execution and lifecycle commands are issued by the application 230 to the TEE VM 218-T. Examples of TEE execution and lifecycle commands include TEE enter, resume, destroy, and error handling.

Next, at step 348, in response to the TEE execution and lifecycle commands, operations specified in the received commands are executed by the TEE VM 218-T. In an embodiment, after these operations have been performed, the TEE VM may be removed from the computer system 200 to save resources of the system.

Figure 4:
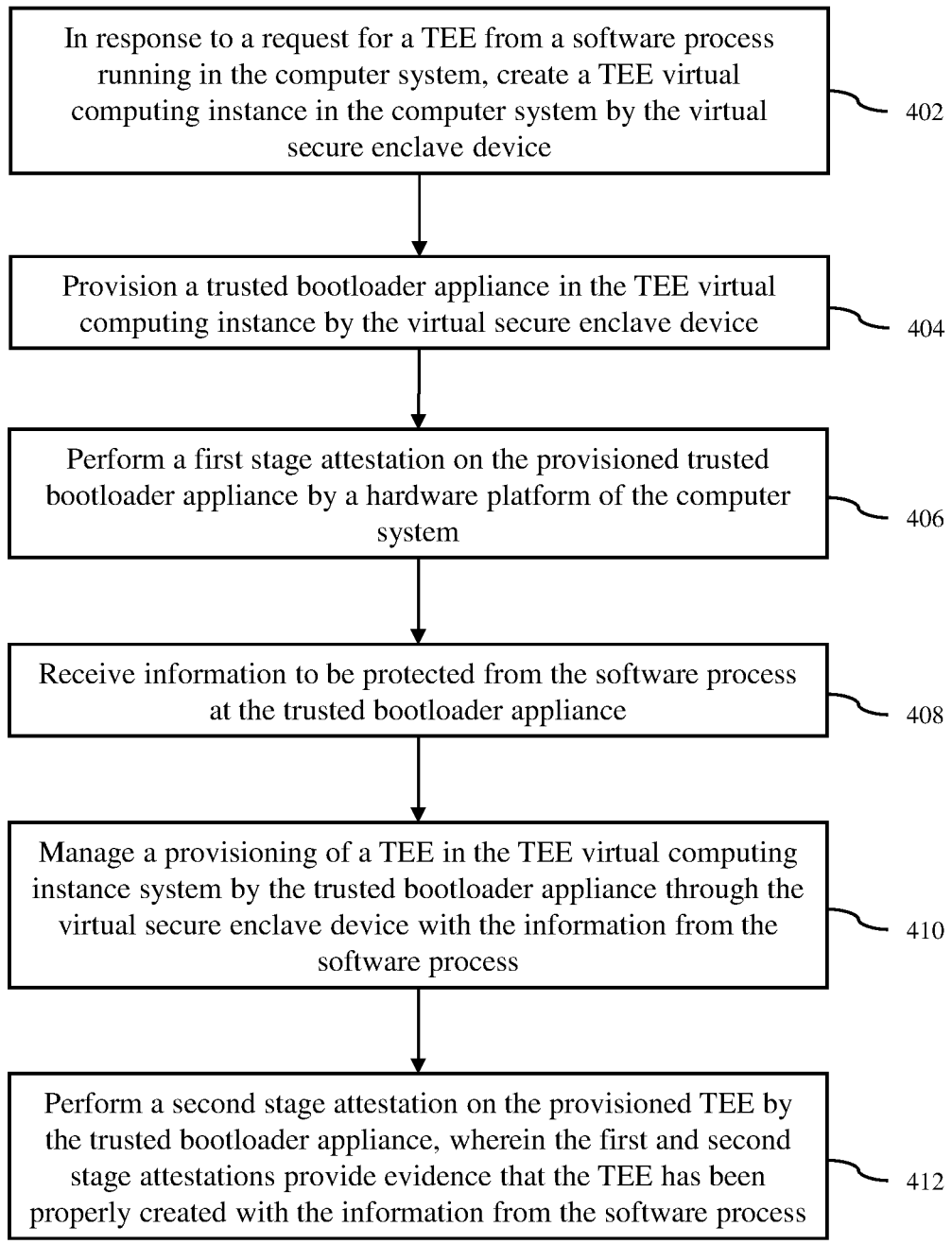
FIG. 4 is a flow diagram of a method performing a remote attestation for creation of a TEE using a virtual secure enclave device running in a virtualized environment in a computer system in accordance with an embodiment of the invention.

A computer-implemented method for performing a remote attestation for creation of a trusted execution environment (TEE) using a virtual secure enclave device running in a virtualized environment in a computer system in accordance with an embodiment of the invention is described with reference to a flow diagram of FIG. 4. At block 402, in response to a request for a TEE from a software process running in the computer system, a TEE virtual computing instance is created in the computer system by the virtual secure enclave device. At block 404, a trusted bootloader appliance is provisioned in the TEE virtual computing instance by the virtual secure enclave device. At block 406, a first stage attestation on the provisioned trusted bootloader appliance is performed by a hardware platform of the computer system. At block 408, information to be protected from the software process is received at the trusted bootloader appliance. At block 410, a provisioning of a TEE in the TEE virtual computing instance is managed by the trusted bootloader appliance through the virtual secure enclave device with the information from the software process. At block 412, a second stage attestation on the provisioned TEE is performed by the trusted bootloader appliance, wherein the first and second stage attestations provide evidence that the TEE has been properly created with the information from the software process.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for performing a remote attestation for creation of a trusted execution environment (TEE) using a virtual secure enclave device running in a virtualized environment in a computer system, the method comprising:
   in response to a request for a TEE from a software process running in the computer system, creating a TEE virtual computing instance in the computer system by the virtual secure enclave device;
   provisioning a trusted bootloader appliance in the TEE virtual computing instance by the virtual secure enclave device;
   performing a first stage attestation on the provisioned trusted bootloader appliance by a hardware platform of the computer system;
   receiving information to be protected from the software process at the trusted bootloader appliance;
   managing a provisioning of a TEE in the TEE virtual computing instance by the trusted bootloader appliance through the virtual secure enclave device with the information from the software process; and
   performing a second stage attestation on the provisioned TEE by the trusted bootloader appliance, wherein the first and second stage attestations provide evidence that the TEE has been properly created with the information from the software process.

2. The method of claim 1, wherein managing the provisioning of the TEE includes receiving memory pages and memory mapping information for the TEE from the software process at the trusted bootloader appliance to provision the TEE.

3. The method of claim 2, further comprising receiving a transport key from the software process at the TEE virtual computing instance via the virtual secure enclave device, the transport key being used to ensure secure communication between the software process and the TEE virtual computing instance.

4. The method of claim 3, wherein the transport key from the software process is encrypted using a shared secret key that is derived at the software process and the hardware platform of the computer system platform using a key exchange algorithm, and wherein the transport key is decrypted using the shared secret key derived at the hardware platform.

5. The method of claim 1, wherein provisioning the trusted bootloader appliance includes creating a secure communication channel between the software process and the trusted bootloader appliance by the virtual secure enclave device.

6. The method of claim 1, wherein performing the first stage attestation includes generating a first stage attestation report at the hardware platform and sending the first stage attestation report to the software process, and wherein performing the second stage attestation includes generating a second stage attestation report at the TEE virtual computing instance platform and sending the second stage attestation report to the software process.

7. The method of claim 6, wherein the first stage attestation report includes a TBA measurement and a certificate from a trusted certificate authority.

8. The method of claim 6, wherein the second stage attestation report includes a TEE measurement and a digital signature.

9. A non-transitory computer-readable storage medium containing program instructions for performing a remote attestation for creation of a trusted execution environment (TEE) using a virtual secure enclave device running in a virtualized environment in a computer system, wherein execution of the program instructions by one or more processors of the computer system causes the one or more processors to perform steps comprising:
in response to a request for a TEE from a software process running in the computer system, creating a TEE virtual computing instance in the computer system by the virtual secure enclave device;
provisioning a trusted bootloader appliance in the TEE virtual computing instance by the virtual secure enclave device;
performing a first stage attestation on the provisioned trusted bootloader appliance by a hardware of the computer system;
receiving information to be protected from the software process at the trusted bootloader appliance;
managing a provisioning of a TEE in the TEE virtual computing instance by the trusted bootloader appliance through the virtual secure enclave device with the information from the software process; and
performing a second stage attestation on the provisioned TEE by the trusted bootloader appliance, wherein the first and second stage attestations provide evidence that the TEE has been properly created with the information from the software process.

10. The computer-readable storage medium of claim 9, wherein managing the provisioning of the TEE includes receiving memory pages and memory mapping information for the TEE from the software process at the trusted bootloader appliance to provision the TEE.

11. The computer-readable storage medium of claim 10, wherein the steps further comprise receiving a transport key from the software process at the TEE virtual computing instance via the virtual secure enclave device, the transport key being used to ensure secure communication between the software process and the TEE virtual computing instance.

12. The computer-readable storage medium of claim 11, wherein the transport key from the software process is encrypted using a shared secret key that is derived at the software process and the hardware platform of the computer system platform using a key exchange algorithm, and wherein the transport key is decrypted using the shared secret key derived at the hardware platform.

13. The computer-readable storage medium of claim 9, wherein provisioning the trusted bootloader appliance includes creating a secure communication channel between the software process and the trusted bootloader appliance by the virtual secure enclave device.

14. The computer-readable storage medium of claim 9, wherein performing the first stage attestation includes generating a first stage attestation report at the hardware platform and sending the first stage attestation report to the software process, and wherein performing the second stage attestation includes generating a second stage attestation report at the TEE virtual computing instance platform and sending the second stage attestation report to the software process.

15. The computer-readable storage medium of claim 14, wherein the first stage attestation report includes a TBA measurement and a certificate from a trusted certificate authority.

16. The computer-readable storage medium of claim 14, wherein the second stage attestation report includes a TEE measurement and a digital signature.

17. A computer system comprising:
memory; and
at least one processor configured to:
in response to a request for a trusted execution environment (TEE) from a software process running in the computer system, create a TEE virtual computing instance in the computer system by a virtual secure enclave device running in a virtualized environment in the computer system;
provision a trusted bootloader appliance in the TEE virtual computing instance by the virtual secure enclave device;
perform a first stage attestation on the provisioned trusted bootloader appliance by a hardware of the computer system;
receive information to be protected from the software process at the trusted bootloader appliance;
manage a provisioning of a TEE in the TEE virtual computing instance by the trusted bootloader appliance through the virtual secure enclave device with the information from the software process; and
perform a second stage attestation on the provisioned TEE by the trusted bootloader appliance, wherein the first and second stage attestations provide evidence that the TEE has been properly created with the information from the software process.

18. The computer system of claim 17, wherein the at least one processor is configured to receive memory pages and memory mapping information for the TEE from the software process at the trusted bootloader appliance to provision the TEE.

19. The computer system of claim 18, wherein the at least one processor is further configured to receive a transport key from the software process at the TEE virtual computing instance via the virtual secure enclave device, wherein the transport key from the software process is encrypted using a shared secret key that is derived at the software process and the hardware platform of the computer system platform using a key exchange algorithm, and wherein the transport key is decrypted using the shared secret key derived at the hardware platform, the transport key being used to ensure secure communication between the software process and the TEE virtual computing instance.

20. The computer system of claim 17, wherein the at least one processor is configured to generate first and second stage attestation reports corresponding to the first and second attestations, respectively, that are sent to the software process, wherein the first stage attestation report includes a TBA measurement and a certificate from a trusted certificate authority, and wherein the second stage attestation report includes a TEE measurement and a digital signature.

\* \* \* \* \*